US010306696B2

(12) United States Patent
Lee et al.

(10) Patent No.: US 10,306,696 B2
(45) Date of Patent: May 28, 2019

(54) METHOD AND APPARATUS FOR HANDLING RAN ASSISTANCE INFORMATION FOR RADIO LINK FAILURE IN WIRELESS COMMUNICATION SYSTEM

(71) Applicant: LG ELECTRONICS INC., Seoul (KR)

(72) Inventors: Jaewook Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 15/308,073

(22) PCT Filed: May 14, 2015

(86) PCT No.: PCT/KR2015/004846
§ 371 (c)(1),
(2) Date: Oct. 31, 2016

(87) PCT Pub. No.: WO2015/174757
PCT Pub. Date: Nov. 19, 2015

(65) Prior Publication Data
US 2017/0064765 A1     Mar. 2, 2017

Related U.S. Application Data

(60) Provisional application No. 61/994,135, filed on May 16, 2014.

(51) Int. Cl.
*H04W 48/10*      (2009.01)
*H04W 76/18*      (2018.01)
(Continued)

(52) U.S. Cl.
CPC .......... *H04W 76/18* (2018.02); *H04W 48/10* (2013.01); *H04W 48/16* (2013.01); *H04W 48/20* (2013.01);
(Continued)

(58) Field of Classification Search
CPC ... H04W 76/18; H04W 48/16; H04W 76/027; H04W 76/19; H04W 48/10; H04W 48/20
See application file for complete search history.

(56) References Cited

U.S. PATENT DOCUMENTS

2011/0230183 A1*  9/2011  Tanaka ................. H04W 76/19
                                                                  455/423
2011/0250880 A1*  10/2011  Olsson ................. H04W 76/18
                                                                  455/423
(Continued)

FOREIGN PATENT DOCUMENTS

CN         101167314        4/2008
CN         104066154        9/2014
(Continued)

OTHER PUBLICATIONS

Broadcom Corporation, "Some Considerations for developing RAN rules for WLAN/3GPP Radio Interworking", 3GPP TSG-RAN WG2 Meeting #86, R2-142071, May 10, 2014, 6 pages.
(Continued)

*Primary Examiner* — Anez C Ebrahim
(74) *Attorney, Agent, or Firm* — Lee Hong Degerman Kang Waimey

(57) ABSTRACT

A method and apparatus for handling radio access network (RAN) assistance information in a wireless communication system is provided. A user equipment (UE) discards first broadcast RAN assistance information when a radio link failure (RLF) occurs, and applies second broadcast RAN assistance information after a specific time. That is, upon
(Continued)

RLF, until when received broadcast RAN assistance information is not applied is defined.

5 Claims, 8 Drawing Sheets

(51) Int. Cl.
    *H04W 76/19*     (2018.01)
    *H04W 48/16*     (2009.01)
    *H04W 48/20*     (2009.01)
    *H04W 48/12*     (2009.01)
    *H04W 84/12*     (2009.01)

(52) U.S. Cl.
    CPC ............ *H04W 76/19* (2018.02); *H04W 48/12* (2013.01); *H04W 84/12* (2013.01)

(56) References Cited

U.S. PATENT DOCUMENTS

2013/0070744 A1* 3/2013 Baek ................... H04W 12/12
                                                        370/338
2015/0078153 A1    3/2015 Kuo et al.

FOREIGN PATENT DOCUMENTS

| EP | 2887740 | 6/2015 |
| EP | 3120615 | 10/2017 |
| WO | 2012149954 A1 | 11/2012 |
| WO | 2014014286 | 1/2014 |
| WO | 2014067876 A1 | 5/2014 |
| WO | 2014069931 | 5/2014 |
| WO | 2014069932 | 5/2014 |
| WO | 2015141970 | 9/2015 |

OTHER PUBLICATIONS

3rd Generation Partnership Project, "Technical Specification Group Radio Access Network; Study on WLAN/3GPP radio interworking (Release 12)", 3GPP TR 37.834 V1.3.0, Nov. 2013, 19 pages.
Ericsson, "Handling of RAN assistance parameters", 3GPP TSG-RAN WG2 #86, Tdoc R2-142369, May 9, 2014, 3 pages.
3rd Generation Partnership Project, "Technical Specification Group Core Network and Terminals; Access Network Discovery and Selection Function (ANDSF) Management Object (MO) (Release 12)", 3GPP TS 24.312 V12.4.0, Mar. 2014, 279 pages.
European Patent Office Application Serial No. 15793576.8, Search Report dated Dec. 18, 2017, 8 pages.
The State Intellectual Property Office of the People's Republic of China Application Serial No. 201580026084.9, Office Action dated Nov. 21, 2018, 7 pages.

* cited by examiner

METHOD AND APPARATUS FOR HANDLING RAN ASSISTANCE INFORMATION FOR RADIO LINK FAILURE IN WIRELESS COMMUNICATION SYSTEM

CROSS-REFERENCE TO RELATED APPLICATIONS

This application is the National Stage filing under 35 U.S.C. 371 of International Application No. PCT/KR2015/004846, filed on May 14, 2015, which claims the benefit of U.S. Provisional Application No. 61/994,135, filed on May 16, 2014, the contents of which are all hereby incorporated by reference herein in their entirety.

BACKGROUND OF THE INVENTION

Field of the Invention

The present invention relates to wireless communications, and more particularly, to a method and apparatus for handling radio access network (RAN) assistance information for radio link failure (RLF) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the evolved packet core (EPC) as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

For efficient traffic steering between 3GPP/WLAN, radio access network (RAN) assistance information may be provided by the network. During radio link failure (RLF), how to handle the RAN assistance information may need to be defined.

SUMMARY OF THE INVENTION

The present invention provides a method and apparatus for handling radio access network (RAN) assistance information for radio link failure (RLF) in a wireless communication system. The present invention provides a method and apparatus for defining until when broadcast RAN assistance information is not applied upon RLF.

In an aspect, a method for handling, by a user equipment (UE), radio access network (RAN) assistance information in a wireless communication system is provided. The method includes discarding first broadcast RAN assistance information when a radio link failure (RLF) occurs, and applying second broadcast RAN assistance information after a specific time.

In another aspect, a user equipment (UE) includes a memory, a transceiver, and a processor coupled to the memory and the transceiver, and configured to discard first broadcast radio access network (RAN) assistance information when a radio link failure (RLF) occurs, and apply second broadcast RAN assistance information after a specific time.

Upon RLF, until when broadcast RAN assistance information is not applied can be clear.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
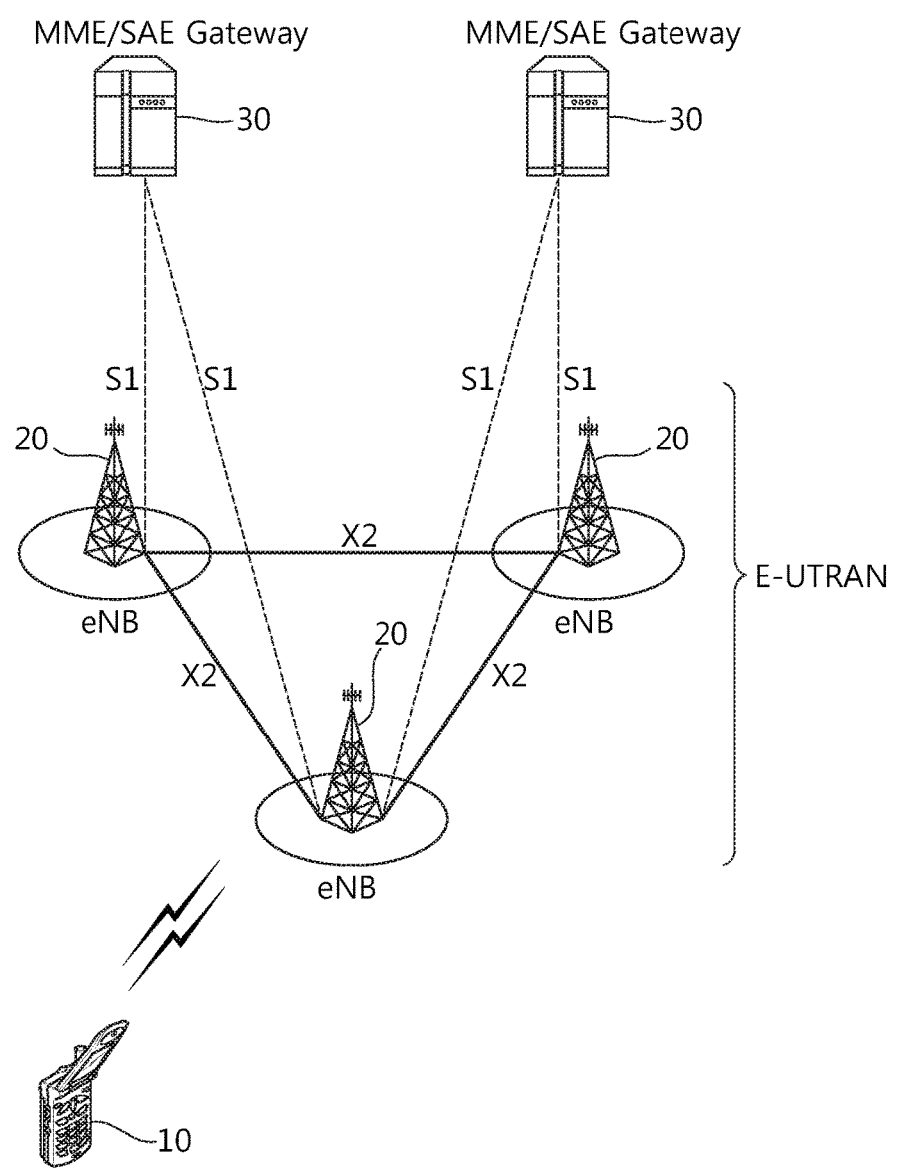
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
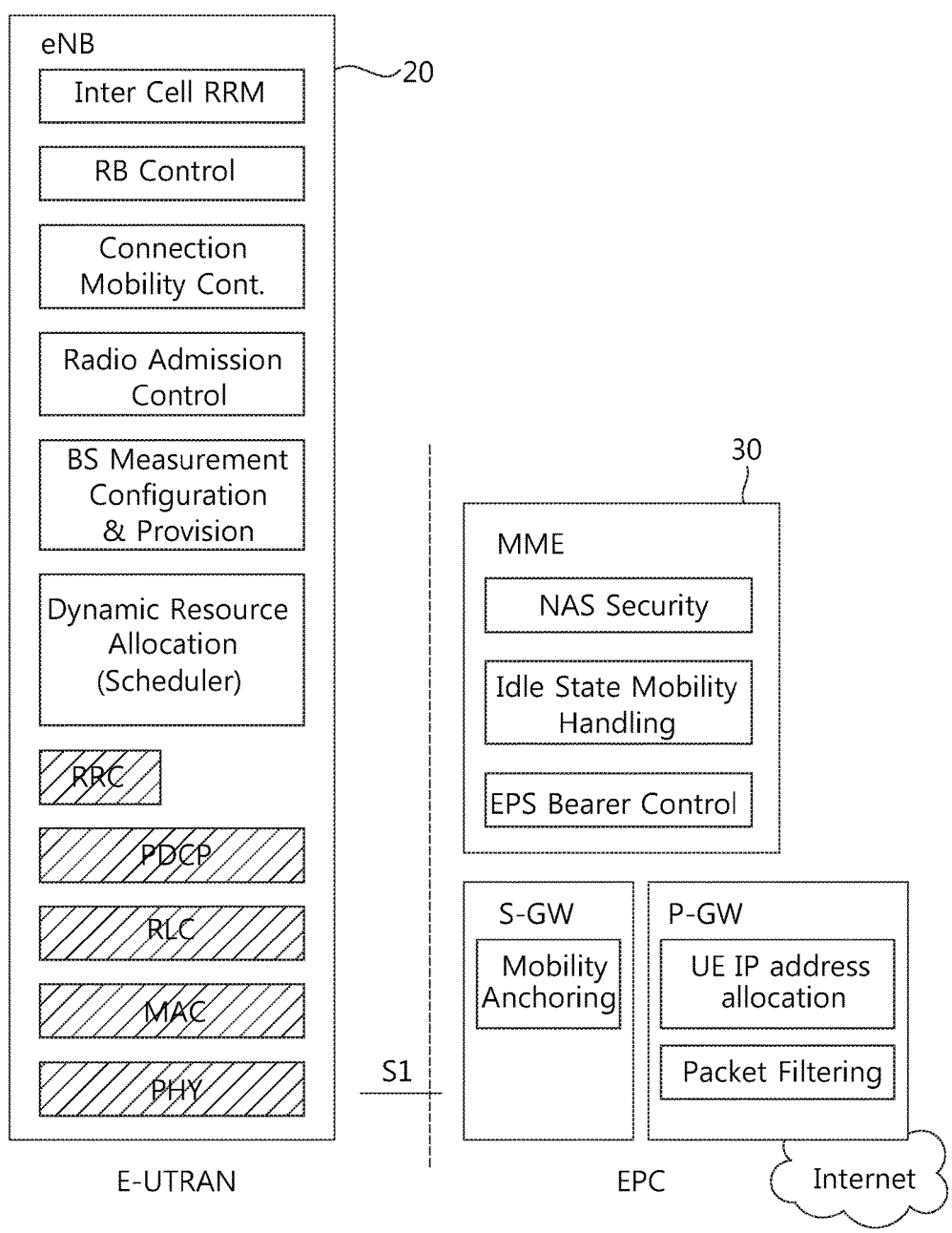
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in $LTE_{13}ACTIVE$ state. In the EPC, and as noted above, gateway 30 may perform functions of paging origination, $LTE_{13}IDLE$ state management, ciphering of the user plane, SAE bearer control, and ciphering and integrity protection of NAS signaling.

Figure 3:
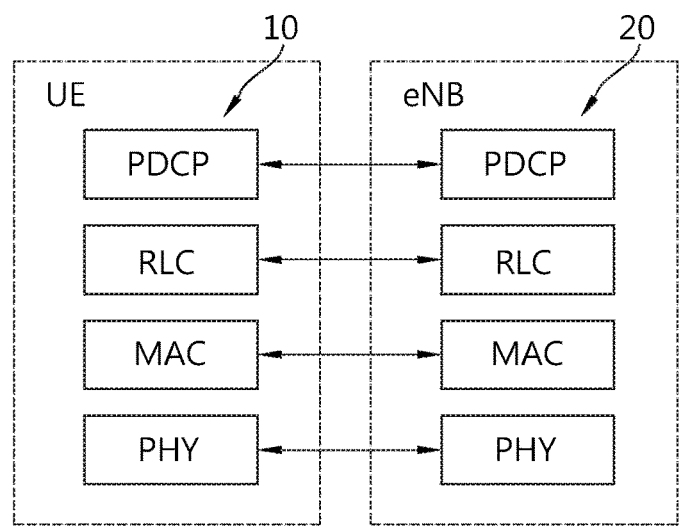
FIG. 3 shows a block diagram of a user plane protocol stack of an LTE system.
Figure 4:
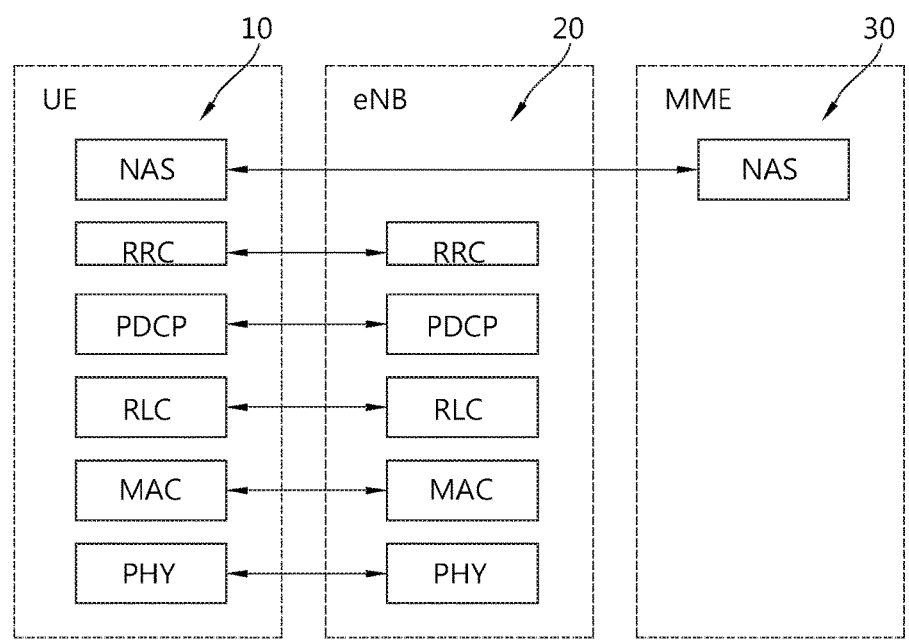
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
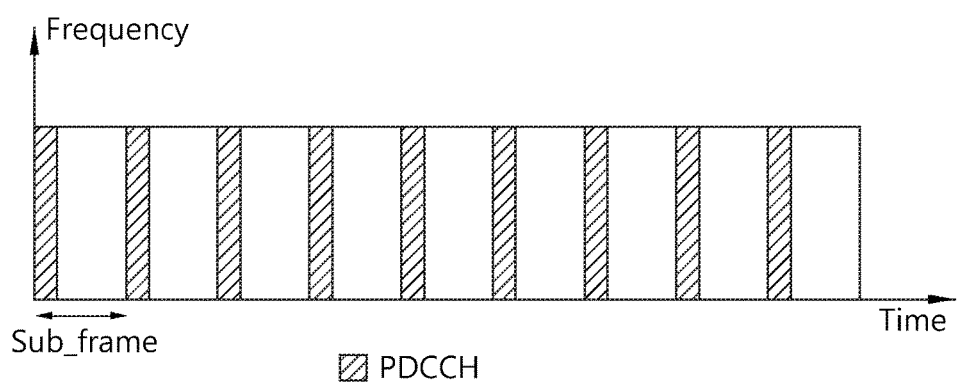
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz industry-science-medical (ISM) band, operating in the United States under Part 15 of the US Federal Communications Commission (FCC) Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Figure 6:
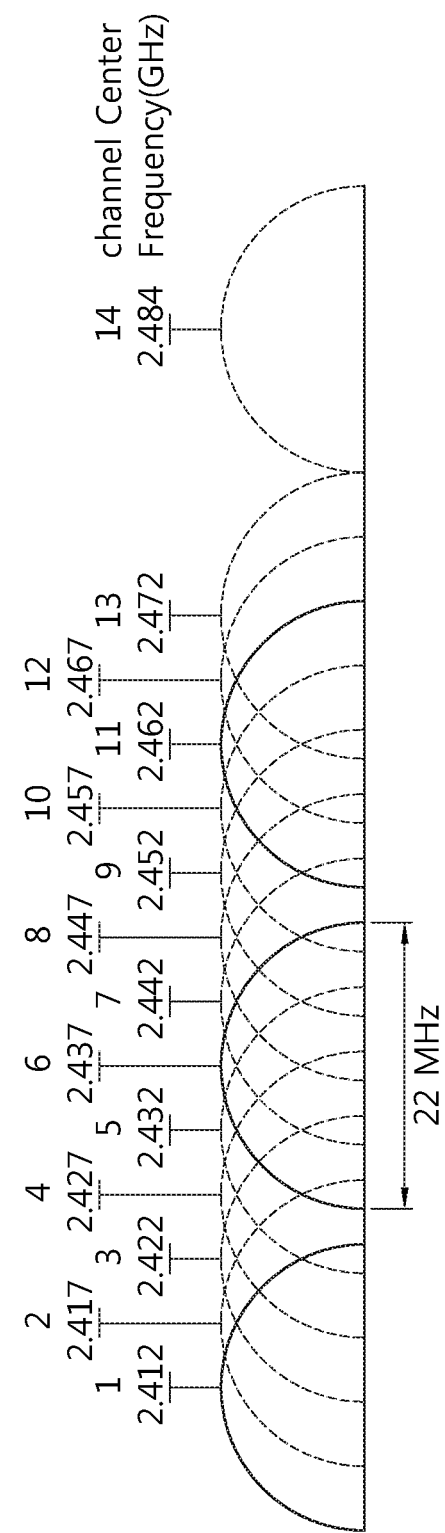
FIG. 6 shows a graphical representation of Wi-Fi channels in 2.4 GHz band.

FIG. 6 shows a graphical representation of Wi-Fi channels in 2.4 GHz band. 802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a 14$^{th}$ channel 12 MHz above channel 13 which was only allowed for 802.11b).

802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels—1, 5, 9 and 13. There are now four because the OFDM modulated 802.11g channels are 20 MHz wide.

In addition to specifying the channel center frequency, 802.11 also specifies a spectral mask defining the permitted power distribution across each channel. The mask requires the signal be attenuated a minimum of 20 dB from its peak amplitude at ±11 MHz from the center frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

Since rel-8, 3GPP has standardized access network discovery and selection functions (ANDSF), which is for interworking between 3GPP access network and non-3GPP access network (e.g. WLAN). The ANDSF is elaborated in 3GPP TS 24.312. The ANDSF management object (MO) is used to manage inter-system mobility policy (ISMP) and inter-system routing policy (ISRP) as well as access network discovery information stored in a UE supporting provisioning of such information from an ANDSF. The ANDSF may initiate the provision of information from the ANDSF to the UE. The UE may initiate the provision of all available information from the ANDSF, using a client-initiated session alert message. The relation between ISMP, ISRP and discovery information is that ISMP prioritize the access network when the UE is not capable to connect to the EPC through multiple accesses, ISRP indicate how to distribute traffic among available accesses when the UE is capable to connect to the EPC through multiple accesses (i.e. the UE is configured for IP flow mobility (IFOM), multiple access connectivity (MAPCON), non-seamless WLAN offload or any combination of these capabilities), while discovery information provide further information for the UE to access the access network defined in the ISMP or in the ISRP. The MO defines validity areas, position of the UE and availability of access networks in terms of geographical coordinates. The UE is not required to switch on all UE's supported radios for deducing its location for ANDSF purposes or for evaluating the validity area condition of a policy or discovery information. The UE shall discard any node which is a child of the ANDSF MO root node and is not supported by the UE. The ANDSF server shall discard any node which is a child of the ANDSF MO root node and is not supported by the ANDSF server.

The UE may be provisioned with multiple valid ISMP, ISRP, inter-APN routing policies (IARP) and WLAN selection policies (WLANSP) rules (by the home PLMN (HPLMN) and by the visited PLMN (VPLMN) when it is roaming). The UE does not apply all these valid rules but selects and applies only the "active" rules. Specifically:

A UE that cannot simultaneously route IP traffic over 3GPP access and over WLAN access shall select an active ISMP rule, an active IARP rule and an active WLANSP rule, as specified below.

A UE that can simultaneously route IP traffic over 3GPP access and over WLAN access shall select an active ISRP rule, an active IARP rule and an active WLANSP rule, as specified below.

When the UE is not roaming, it shall select the active ISMP/ISRP rule, the active IARP rule and the active WLANSP rule to apply from the valid rules provided by the HPLMN based on the individual priorities of these rules (or based on other criteria). For example, the highest priority valid WLANSP rule is selected as the active WLANSP rule.

When the UE is roaming, it may have valid rules from both HPLMN and VPLMN. In this case, the UE shall select the active rules as follows:

1) The active IARP rule is selected from the valid IARP rules provided by the HPLMN.

2) The active ISMP/ISRP rule and the active WLANSP rule are selected based on the UE configuration as follows:

a) The UE is configured to "prefer WLAN selection rules provided by the HPLMN" or not. This configuration can be done either by the user or by the home ANDSF (H-ANDSF) via the list of "VPLMNs with preferred WLAN Selection Rules". User configuration takes precedence over the H-ANDSF configuration.

b) If the UE is configured not to prefer WLAN selection rules provided by the HPLMN (i.e. the VPLMN to which the UE is registered is included in the list of "VPLMNs with preferred WLAN Selection Rules"), then the UE shall check the WLANSP rule of the VPLMN and shall determine if there are available WLAN access networks that match one or more groups of selection criteria in this rule.

i) If there is at least one WLAN access network that matches one or more groups of selection criteria in the WLANSP rule of the VPLMN, then the UE shall select the active WLANSP rule and the active ISMP/ISRP rule from the valid rules provided by the VPLMN (based on their priority values).

ii) If there is no WLAN access network that matches one or more groups of selection criteria in the WLANSP rule of the VPLMN, then the UE shall select the active WLANSP rule and the active ISMP/ISRP rule from the valid rules provided by the HPLMN. When the UE determines that at least one WLAN access network that matches one or more groups of selection criteria in the WLANSP rule of the VPLMN becomes available, it shall operate as in bullet i) above and may re-select to such WLAN access network.

c) If the UE is configured to prefer WLAN selection rules provided by the HPLMN (i.e. the VPLMN to which the UE is registered is not included in the list of "VPLMNs with preferred WLAN Selection Rules"), then the UE shall check the WLANSP rule of the HPLMN and shall determine if there are available WLAN access networks that match one or more groups of selection criteria in this rule.

i) If there is at least one WLAN access network that matches one or more groups of selection criteria in the WLANSP rule of the HPLMN, then the UE shall select the active WLANSP rule and the active ISMP/ISRP rule from the valid rules provided by the HPLMN (based on their priority values).

ii) If there is no WLAN access network that matches one or more groups of selection criteria in the WLANSP rule of the HPLMN, then the UE shall select the active WLANSP rule and the active ISMP/ISRP rule from the valid rules provided by the VPLMN. When the UE determines that at least one WLAN access network that matches one or more groups of selection criteria in the WLANSP rule of the HPLMN becomes available, it shall operate as in bullet i) above and may re-select to such WLAN access network.

During power-up, while the UE has not registered to any PLMN, the UE shall consider the WLANSP rules provided by the HPLMN as valid and shall select an active WLANSP rule as described above (the one with the highest priority). Thus during power-up the UE can select a WLAN network based on the WLANSP rules provided by HPLMN.

In addition to ANDSF, additional policy may be specified in RAN specification for interworking between 3GPP access network and non-3GPP access network (e.g. WLAN). The additional policy for interworking between 3GPP access network and non-3GPP access network may be referred to as RAN rules. The RAN rule may indicate condition(s) in which the UE is allowed/required to perform traffic steering from 3GPP LTE to WLAN or vice versa. The condition may involve evaluation of measurement results of 3GPP LTE cell, where the measurement result is compared with a relevant RAN rule parameter (i.e., measurement threshold) included in the RAN assistance information. The condition may also involve evaluation of measurement results of WLAN, where the measurement result is compared with a relevant RAN rule parameter (i.e., measurement threshold) indicated by the RAN assistance information.

For ANDSF and RAN rule, the following RAN assistance parameters (or information) may be provided by the RAN and used by the RAN rules and the ANDSF. The RAN assistance information may be provided to the UE via broadcast signaling, i.e. in SystemInformationBlockType17, or via dedicated signaling, i.e. in the RRCConnectionReconfiguration message. The RAN assistance information received in SystemInformationBlockType17 is valid only if the UE is camped on a suitable cell. The following RAN assistance parameters provided by the RAN may replace corresponding parameters in ANDSF and RAN rule.

LTE reference signal received power (RSRP)/UMTS common pilot channel (CPICH) received signal code power (RSCP) threshold (for frequency division duplex (FDD))/UMTS primary common control physical channel (PCCPCH) RSCP threshold (for time division duplex (TDD))

LTE reference signal received quality (RSRQ)/UMTS CPICH Ec/No threshold (for FDD)

WLAN channel utilization in the basic service set (BSS) load IE (MaximumBSSLoadValue) threshold (the parameter is used 1-way for determining offload possibility from 3GPP to WLAN or alternatively hysteresis is used to prevent ping-pong)

Available WLAN DL and UL backhaul data rate (MinBackhaulThreshold) threshold (the parameter is used 1-way for determining offload possibility from 3GPP to WLAN or hysteresis is used to prevent ping-pong)

Further, offload preference indicator (OPI) may be provided by the RAN and used by the ANDSF. The OPI value provided by the RAN is compared to a comparison-value provided in the ANDSF policy using an "equal to"—comparison (e.g. OPI_pointer=OPI value) or a "greater/less than"—comparison (e.g. OPI_threshold≥OPI_value) or may be compared to a bitmap (e.g. a set of allowed OPI values) to trigger specific actions, e.g.:

1. OPI may be used in ANDSF to differentiate subscriber subgroups, i.e. gold/silver/bronze. For instance, different subscriber subgroups may have different OPI thresholds/pointers in their ANDSF policies, so that bronze users are offloaded to WLAN first (when cellular load slightly increases) and gold users are kept on LTE till LTE capacity allows so.

2. OPI may be used to differentiate between traffic types, e.g. ANDSF ISRP policies for different IP flows may have different OPI thresholds/pointers so that best effort traffic is offloaded to WLAN first (when cellular load slightly increases).

3. OPI may also be used to trigger specific parts of ANDSF policies and/or ANDSF MOs, OPI may be signaled to the UE in the form of a bitmap which may be compared to a bitmap (e.g. a set of allowed OPI values) stored in the ANDSF to trigger specific parts of ANDSF policies and/or ANDSF MOs. In this case, OPI value may be considered as kind of ANDSF MO index if there are multiple ANDSF MOs.

Examples and clarifications regarding RAN assistance parameters usage in RAN rules and ANDSF are described below. For each parameter "xxx", there may be two thresholds indicated by the RAN, i.e. "thresXxxLow" for lower threshold, and "thresXxxHigh" for higher threshold.

For 3GPP LTE, the RAN assistance parameters may be used for traffic steering between 3GPP/WLAN as follows. The UE shall move traffic (e.g. for offloadable access point name (APN)) from 3GPP to WLAN if all the following conditions are fulfilled if corresponding parameters are broadcast or send with dedicated signaling:
  Rsrp<threshRsrpLow or Rsrq<threshRsrqLow
  bssLoad<threshBssLoadLow
  dlBackhaulRate>threshDlBackhaulRateHigh
  ulBackhaulRate>threshUlBackhaulRateHigh The UE shall move offloadable traffic from WLAN to 3GPP if one or more of the following conditions is fulfilled if corresponding parameters are broadcast or send with dedicated signaling:
  Rsrp>threshRsrpHigh
  Rsrq>threshRsrqHigh For 3GPP UMTS, the RAN assistance parameters may be used for traffic steering between 3GPP/WLAN as follows. The UE shall move traffic (e.g. for offloadable APN) from 3GPP to WLAN if all the following conditions are fulfilled if corresponding parameters are broadcast or send with dedicated signaling:
  Rscp<threshRscpLow or EcNo<threshEcNoLow
  bssLoad<threshBssLoadLow
  dlBackhaulRate>threshDlBackhaulRateHigh
  ulBackhaulRate>threshUlBackhaulRateHigh The UE shall move offloadable traffic from WLAN to 3GPP if one or more of the following conditions is fulfilled if corresponding parameters are broadcast or send with dedicated signaling:
  Rscp>threshRscpHigh
  EcNo>threshEcNoHigh Currently, a UE in RRC_CONNECTED in 3GPP LTE or CELL_DCH (or CELL_FACH) in UMTS may apply RAN assistance information received via dedicated signaling (hereinafter, dedicated RAN assistance information) if such has been received. Otherwise, the UE may apply RAN assistance information received via broadcast signaling (hereinafter, broadcast RAN assistance information). Further, the UE may keep and apply the dedicated RAN assistance information when the UE is in RRC_IDLE in LTE, or CELL_PCH (or URA_PCH) in UMTS, until a time T has passed since the UE has entered RRC_IDLE in 3GPP LTE, or CELL_PCH (or URA_PCH) in UMTS, thereafter the UE may apply the broadcast RAN assistance information. That is, the dedicated RAN assistance information is applied while a timer is running, and upon expiry of the timer, the dedicated RAN assistance information is discarded and the broadcast RAN assistance information is applied. However, currently it is not clear how to handle the broadcast RAN assistance information upon radio link failure (RLF).

In order to solve the problem described above, a method for handling RAN assistance information for RLF according to an embodiment of the present invention is described below.

Figure 7:
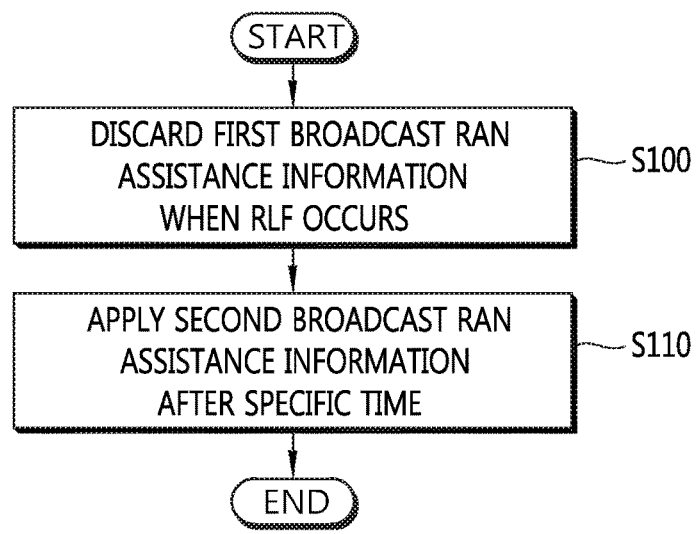
FIG. 7 shows an example of a method for handling RAN assistance information according to an embodiment of the present invention.

FIG. 7 shows an example of a method for handling RAN assistance information according to an embodiment of the present invention.

In step S100, the UE discards dedicated RAN assistance information and first broadcast RAN assistance information when RLF occurs. Alternatively, the UE discards dedicated RAN assistance information when the UE selects or reselects a cell, which is not the primary cell (PCell) where the dedicated RAN assistance information was configured, after RLF occurs. The UE may stop using the dedicated/first broadcast RAN assistance information or remove the dedicated/first RAN broadcast assistance information.

In step S110, the UE applies second broadcast RAN assistance information after a specific time. For example, the UE may receive the second broadcast RAN assistance information via system information during a RRC connection re-establishment procedure after the RLF occurs. However, upon acquisition of the second broadcast RAN assistance information via system information during the RRC connection re-establishment procedure, the UE may not apply the second broadcast RAN assistance information may not perform RAN rule. The UE may apply the second broadcast RAN assistance information after a successful completion of the RRC connection re-establishment procedure (i.e. receiving RRCConnectionReestablishment message).

After the successful completion of the RRC connection re-establishment procedure, the UE may forward the second broadcast RAN assistance information to upper layer for ANDSF.

Alternatively, the UE may receive the second broadcast RAN assistance information via system information during a timer, i.e. T311 is running after the RLF occurs. However, upon acquisition of the second broadcast RAN assistance information during T311 is running, the UE may not apply the second broadcast RAN assistance information and may not perform RAN rule. The UE may apply the second broadcast RAN assistance information upon expiry or stop of T311. Upon expiry or stop of T311, the UE may forward the second broadcast RAN assistance information to upper layer for ANDSF.

Alternatively, from the time the UE declares the RLF until first RRC reconfiguration after successful RRC connection re-establishment procedure, the UE may not apply the second broadcast RAN assistance information and may not perform RAN rule. After receiving the first RRC reconfiguration after the successful RRC connection re-establishment procedure, the UE may forward the second broadcast RAN assistance information to upper layer for ANDSF.

Figure 8:
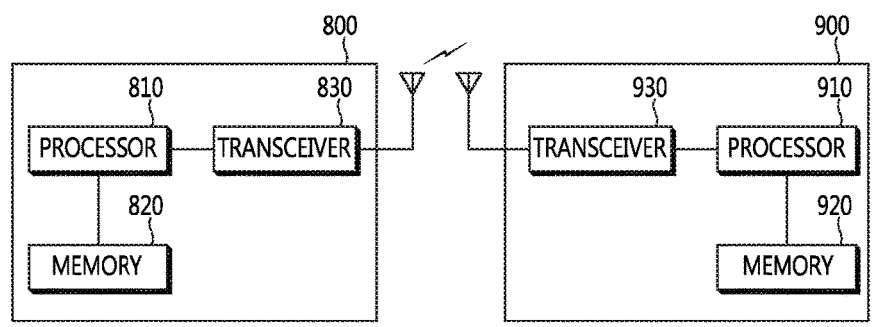
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for applying second radio access network (RAN) assistance information in a wireless communication system, the method performed by a user equipment (UE) and comprising:
   discarding first broadcast RAN assistance information when a radio link failure (RLF) occurs;
   receiving the second broadcast RAN assistance information via system information after the RLF occurs and while a specific timer is running; and
   applying the second broadcast RAN assistance information and performing a corresponding RAN rule based on whether the specific timer is running or not,
   wherein the UE does not apply the second broadcast RAN assistance information and does not perform the corresponding RAN rule while the specific timer is running, and
   wherein upon expiry or stop the specific timer, the UE applies the second broadcast RAN assistance information and performs the corresponding RAN rule.

2. The method of claim 1, wherein applying the second broadcast RAN assistance information comprises forwarding the second broadcast RAN assistance information to an upper layer for access network discovery and selection functions (ANDSF).

3. The method of claim 1, further comprising discarding dedicated RAN assistance information when the RLF occurs.

4. The method of claim 1, further comprising discarding dedicated RAN assistance information when the a cell, which is not a primary cell (PCell) where the dedicated RAN assistance information was configured, is selected after the RLF occurs.

5. A user equipment (UE) comprising:
   a memory;
   a transceiver; and
   a processor coupled to the memory and the transceiver, and configured to:
   discard first broadcast radio access network (RAN) assistance information when a radio link failure (RLF) occurs;
   receive second broadcast RAN assistance information via system information after the RLF occurs and while a specific timer is running; and
   apply the second broadcast RAN assistance information and perform a corresponding RAN rule based on whether the specific timer is running or not,
   wherein the UE does not apply the second broadcast RAN assistance information and does not perform the corresponding RAN rule while the specific timer is running, and
   wherein upon expiry or stop the specific timer, the UE applies the second broadcast RAN assistance information and performs the corresponding RAN rule.

* * * * *